(12) United States Patent
Line et al.

(10) Patent No.: US 9,365,142 B1
(45) Date of Patent: Jun. 14, 2016

(54) MANUAL INDEPENDENT THIGH EXTENSIONS

(71) Applicant: Ford Global Technologies, LLC, Dearborn, MI (US)

(72) Inventors: Johnathan Andrew Line, Northville, MI (US); Christian J. Hosbach, Taylor, MI (US); Brandon W. Nichols, Hillsdale, MI (US); Paul Iacoban, Dearborn, MI (US); Mandeep Singh Sidhu, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/600,166

(22) Filed: Jan. 20, 2015

(51) Int. Cl.
*B60N 2/02* (2006.01)
*B60N 2/62* (2006.01)

(52) U.S. Cl.
CPC ... *B60N 2/62* (2013.01); *B60N 2/02* (2013.01)

(58) Field of Classification Search
CPC .................................. B60N 2/02; B60N 2/62
USPC ............................ 297/284.9, 284.11, 452.25
See application file for complete search history.

(56) References Cited

U.S. PATENT DOCUMENTS

| | | |
|---|---|---|
| 2,958,369 A | 11/1960 | Pitts et al. |
| 3,403,938 A | 10/1968 | Cramer et al. |
| 3,929,374 A | 12/1975 | Hogan et al. |
| 4,324,431 A | 4/1982 | Murphy et al. |
| 4,334,709 A | 6/1982 | Akiyama et al. |
| 4,353,595 A | 10/1982 | Kaneko et al. |
| 4,491,365 A | 1/1985 | Murakami |
| 4,522,445 A * | 6/1985 | Goldner ............... B60N 2/1892 297/284.9 X |
| 4,541,669 A | 9/1985 | Goldner |
| 4,629,248 A | 12/1986 | Mawbey |
| 4,664,444 A | 5/1987 | Murphy |

(Continued)

FOREIGN PATENT DOCUMENTS

| | | |
|---|---|---|
| EP | 0754590 | 1/1997 |
| EP | 0926969 | 1/2002 |

(Continued)

OTHER PUBLICATIONS

M. Grujicic et al., "Seat-cushion and soft-tissue material modeling and a finite element investigation of the seating comfort for passenger-vehicle occupants," Materials and Design 30 (2009) 4273-4285.

(Continued)

*Primary Examiner* — Rodney B White
(74) *Attorney, Agent, or Firm* — Vichit Chea; Price Heneveld LLP

(57) ABSTRACT

A vehicle seating assembly includes a seat base. A seatback is operably coupled to a rear of the seat base. First and second independently moveable thigh supports include a top side, a bottom side, an exterior side, and an interior side. A slide assembly is operably coupled to each of the thigh supports. Each of the thigh supports are independently laterally translatable forward relative to the seat base. A button assembly operably secures each of the thigh supports at any of a multitude of lateral positions. The button assembly is disposed on the exterior side of each thigh support. A spring assembly urges each thigh support to a fully forward lateral position. A pivot member operably couples each of the thigh supports to the seat base. Each of the thigh supports are rotatable relative to the seat base.

20 Claims, 14 Drawing Sheets

(56) References Cited

U.S. PATENT DOCUMENTS

| | | | |
|---|---|---|---|
| 4,720,141 A | 1/1988 | Sakamoto et al. | |
| 4,915,447 A | 4/1990 | Shovar | |
| 5,171,062 A | 12/1992 | Courtois | |
| 5,174,526 A | 12/1992 | Kanigowski | |
| 5,518,294 A | 5/1996 | Ligon, Sr. et al. | |
| 5,560,681 A | 10/1996 | Dixon et al. | |
| 5,647,635 A | 7/1997 | Aumond et al. | |
| 5,681,084 A * | 10/1997 | Yoneda | A47D 1/002 297/284.9 |
| 5,755,493 A | 5/1998 | Kodaverdian | |
| 5,769,489 A | 6/1998 | Dellanno | |
| 5,826,938 A | 10/1998 | Yanase et al. | |
| 5,836,648 A | 11/1998 | Karschin et al. | |
| 5,902,014 A | 5/1999 | Dinkel et al. | |
| 5,913,568 A | 6/1999 | Brightbill et al. | |
| 5,951,039 A | 9/1999 | Severinski et al. | |
| 6,024,406 A | 2/2000 | Charras et al. | |
| 6,062,642 A | 5/2000 | Sinnhuber et al. | |
| 6,106,163 A | 8/2000 | Inana et al. | |
| 6,145,925 A | 11/2000 | Eksin et al. | |
| 6,155,593 A | 12/2000 | Kimura et al. | |
| 6,179,379 B1 | 1/2001 | Andersson | |
| 6,189,966 B1 | 2/2001 | Faust et al. | |
| 6,196,627 B1 | 3/2001 | Faust et al. | |
| 6,206,466 B1 | 3/2001 | Komatsu | |
| 6,217,062 B1 | 4/2001 | Breyvogel et al. | |
| 6,220,661 B1 | 4/2001 | Peterson | |
| 6,224,150 B1 | 5/2001 | Eksin et al. | |
| 6,296,308 B1 | 10/2001 | Cosentino et al. | |
| 6,312,050 B1 | 11/2001 | Eklind | |
| 6,364,414 B1 | 4/2002 | Specht | |
| 6,375,269 B1 | 4/2002 | Maeda et al. | |
| 6,394,546 B1 | 5/2002 | Knoblock et al. | |
| 6,419,317 B1 | 7/2002 | Westrich et al. | |
| 6,454,353 B1 | 9/2002 | Knaus | |
| 6,523,892 B1 | 2/2003 | Kage et al. | |
| 6,550,856 B1 | 4/2003 | Ganser et al. | |
| 6,565,150 B2 | 5/2003 | Fischer et al. | |
| 6,619,605 B2 | 9/2003 | Lambert | |
| 6,682,140 B2 | 1/2004 | Minuth et al. | |
| 6,695,406 B2 | 2/2004 | Plant | |
| 6,698,832 B2 | 3/2004 | Boudinot | |
| 6,736,452 B2 | 5/2004 | Aoki et al. | |
| 6,758,522 B2 | 7/2004 | Ligon, Sr. et al. | |
| 6,808,230 B2 | 10/2004 | Buss et al. | |
| 6,824,212 B2 | 11/2004 | Malsch et al. | |
| 6,848,742 B1 | 2/2005 | Aoki et al. | |
| 6,860,559 B2 | 3/2005 | Schuster, Sr. et al. | |
| 6,860,564 B2 | 3/2005 | Reed et al. | |
| 6,866,339 B2 | 3/2005 | Itoh | |
| 6,869,140 B2 | 3/2005 | White et al. | |
| 6,890,029 B2 | 5/2005 | Svantesson | |
| 6,938,953 B2 | 9/2005 | Håland et al. | |
| 6,955,399 B2 | 10/2005 | Hong | |
| 6,962,392 B2 | 11/2005 | O'Connor | |
| 6,988,770 B2 | 1/2006 | Witchie | |
| 6,997,473 B2 | 2/2006 | Tanase et al. | |
| 7,040,699 B2 | 5/2006 | Curran et al. | |
| 7,100,992 B2 | 9/2006 | Bargheer et al. | |
| 7,131,694 B1 | 11/2006 | Buffa | |
| 7,159,934 B2 | 1/2007 | Farquhar et al. | |
| 7,185,950 B2 | 3/2007 | Pettersson et al. | |
| 7,213,876 B2 | 5/2007 | Stoewe | |
| 7,229,118 B2 | 6/2007 | Saberan et al. | |
| 7,261,371 B2 | 8/2007 | Thunissen et al. | |
| 7,344,189 B2 | 3/2008 | Reed et al. | |
| 7,350,859 B2 | 4/2008 | Klukowski | |
| 7,393,005 B2 | 7/2008 | Inazu et al. | |
| 7,425,034 B2 | 9/2008 | Bajic et al. | |
| 7,441,838 B2 | 10/2008 | Patwardhan | |
| 7,467,823 B2 | 12/2008 | Hartwich | |
| 7,478,869 B2 | 1/2009 | Lazanja et al. | |
| 7,481,489 B2 | 1/2009 | Demick | |
| 7,506,924 B2 | 3/2009 | Bargheer et al. | |
| 7,506,938 B2 | 3/2009 | Brennan et al. | |
| 7,530,633 B2 | 5/2009 | Yokota et al. | |
| 7,543,888 B2 | 6/2009 | Kuno | |
| 7,578,552 B2 | 8/2009 | Bajic et al. | |
| 7,597,398 B2 | 10/2009 | Lindsay | |
| 7,614,693 B2 | 11/2009 | Ito | |
| 7,641,281 B2 | 1/2010 | Grimm | |
| 7,669,925 B2 | 3/2010 | Beck et al. | |
| 7,669,928 B2 | 3/2010 | Snyder | |
| 7,712,833 B2 | 5/2010 | Ueda | |
| 7,717,459 B2 | 5/2010 | Bostrom et al. | |
| 7,726,733 B2 | 6/2010 | Balser et al. | |
| 7,735,932 B2 | 6/2010 | Lazanja et al. | |
| 7,752,720 B2 | 7/2010 | Smith | |
| 7,753,451 B2 | 7/2010 | Maebert et al. | |
| 7,775,602 B2 | 8/2010 | Lazanja et al. | |
| 7,784,863 B2 | 8/2010 | Fallen | |
| 7,802,843 B2 | 9/2010 | Andersson et al. | |
| 7,819,470 B2 | 10/2010 | Humer et al. | |
| 7,823,971 B2 | 11/2010 | Humer et al. | |
| 7,845,729 B2 | 12/2010 | Yamada et al. | |
| 7,857,381 B2 | 12/2010 | Humer et al. | |
| 7,871,126 B2 | 1/2011 | Becker et al. | |
| 7,891,701 B2 | 2/2011 | Tracht et al. | |
| 7,909,360 B2 | 3/2011 | Marriott et al. | |
| 7,909,401 B2 | 3/2011 | Hofmann et al. | |
| 7,931,294 B2 | 4/2011 | Okada et al. | |
| 7,931,330 B2 | 4/2011 | Itou et al. | |
| 7,946,649 B2 | 5/2011 | Galbreath et al. | |
| 7,963,553 B2 | 6/2011 | Huynh et al. | |
| 7,963,595 B2 | 6/2011 | Ito et al. | |
| 7,963,600 B2 | 6/2011 | Alexander et al. | |
| 7,971,931 B2 | 7/2011 | Lazanja et al. | |
| 7,971,937 B2 | 7/2011 | Ishii et al. | |
| 8,011,726 B2 | 9/2011 | Omori et al. | |
| 8,016,355 B2 | 9/2011 | Ito et al. | |
| 8,029,055 B2 | 10/2011 | Hartlaub | |
| 8,038,222 B2 | 10/2011 | Lein et al. | |
| 8,075,053 B2 | 12/2011 | Tracht et al. | |
| 8,109,569 B2 | 2/2012 | Mitchell | |
| 8,123,246 B2 | 2/2012 | Gilbert et al. | |
| 8,128,167 B2 | 3/2012 | Zhong et al. | |
| 8,162,391 B2 | 4/2012 | Lazanja et al. | |
| 8,162,397 B2 | 4/2012 | Booth et al. | |
| 8,167,370 B2 | 5/2012 | Arakawa et al. | |
| 8,210,568 B2 | 7/2012 | Ryden et al. | |
| 8,210,605 B2 | 7/2012 | Hough et al. | |
| 8,210,611 B2 | 7/2012 | Aldrich et al. | |
| 8,226,165 B2 | 7/2012 | Mizoi | |
| 8,342,607 B2 | 1/2013 | Hofmann et al. | |
| 8,408,646 B2 | 4/2013 | Harper et al. | |
| 8,602,493 B1 * | 12/2013 | Chen | A47C 7/022 297/284.9 |
| 2004/0195870 A1 | 10/2004 | Bohlender et al. | |
| 2005/0140193 A1 * | 6/2005 | Skelly | A47C 7/503 297/284.9 |
| 2005/0179291 A1 * | 8/2005 | Brodeur | A47C 7/024 297/284.9 |
| 2005/0200166 A1 | 9/2005 | Noh | |
| 2006/0043777 A1 | 3/2006 | Friedman et al. | |
| 2006/0214487 A1 * | 9/2006 | Holdampf | A47C 7/46 297/284.9 |
| 2007/0120401 A1 | 5/2007 | Minuth et al. | |
| 2008/0036258 A1 * | 2/2008 | Holdampf | B60N 2/449 297/2.9 |
| 2008/0174159 A1 | 7/2008 | Kojima et al. | |
| 2009/0066122 A1 | 3/2009 | Minuth et al. | |
| 2009/0165263 A1 | 7/2009 | Smith | |
| 2009/0322124 A1 | 12/2009 | Barkow et al. | |
| 2010/0038937 A1 | 2/2010 | Andersson et al. | |
| 2010/0140986 A1 | 6/2010 | Sawada | |
| 2010/0171346 A1 | 7/2010 | Laframboise et al. | |
| 2010/0187881 A1 | 7/2010 | Fujita et al. | |
| 2010/0201167 A1 | 8/2010 | Wieclawski | |
| 2010/0231013 A1 | 9/2010 | Schlenker | |
| 2010/0270840 A1 | 10/2010 | Tanaka et al. | |
| 2010/0301650 A1 | 12/2010 | Hong | |
| 2010/0320816 A1 | 12/2010 | Michalak | |
| 2011/0018498 A1 | 1/2011 | Soar | |
| 2011/0074185 A1 | 3/2011 | Nakaya et al. | |

(56) References Cited

U.S. PATENT DOCUMENTS

| | | |
|---|---|---|
| 2011/0095513 A1 | 4/2011 | Tracht et al. |
| 2011/0095578 A1 | 4/2011 | Festag |
| 2011/0109127 A1 | 5/2011 | Park et al. |
| 2011/0109128 A1 | 5/2011 | Axakov et al. |
| 2011/0121624 A1 | 5/2011 | Brncick et al. |
| 2011/0133525 A1 | 6/2011 | Oota |
| 2011/0163574 A1 | 7/2011 | Tame et al. |
| 2011/0163583 A1 | 7/2011 | Zhong et al. |
| 2011/0186560 A1 | 8/2011 | Kennedy et al. |
| 2011/0187174 A1 | 8/2011 | Tscherbner |
| 2011/0254335 A1 | 10/2011 | Pradier et al. |
| 2011/0260506 A1 | 10/2011 | Kuno |
| 2011/0272548 A1 | 11/2011 | Rudkowski et al. |
| 2011/0272978 A1 | 11/2011 | Nitsuma |
| 2011/0278885 A1 | 11/2011 | Procter et al. |
| 2011/0278886 A1 | 11/2011 | Nitsuma |
| 2011/0298261 A1 | 12/2011 | Holt et al. |
| 2012/0032486 A1 | 2/2012 | Baker et al. |
| 2012/0037754 A1 | 2/2012 | Kladde |
| 2012/0063081 A1 | 3/2012 | Grunwald |
| 2012/0080914 A1 | 4/2012 | Wang |
| 2012/0091695 A1 | 4/2012 | Richez et al. |
| 2012/0091766 A1 | 4/2012 | Yamaki et al. |
| 2012/0091779 A1 | 4/2012 | Chang et al. |
| 2012/0109468 A1 | 5/2012 | Baumann et al. |
| 2012/0119551 A1 | 5/2012 | Brncick et al. |
| 2012/0125959 A1 | 5/2012 | Kucera |
| 2012/0127643 A1 | 5/2012 | Mitchell |
| 2012/0129440 A1 | 5/2012 | Kitaguchi et al. |
| 2012/0162891 A1 | 6/2012 | Tranchina et al. |
| 2012/0175924 A1 | 7/2012 | Festag et al. |
| 2012/0187729 A1 | 7/2012 | Fukawatase et al. |
| 2012/0248833 A1 | 10/2012 | Hontz et al. |
| 2012/0261974 A1 | 10/2012 | Yoshizawa et al. |
| 2013/0076092 A1 | 3/2013 | Kulkarni et al. |
| 2013/0257126 A1* | 10/2013 | Freisleben ........... B60N 2/0232 297/311 |
| 2014/0203617 A1* | 7/2014 | Line ..................... B60N 2/4495 297/423.29 |
| 2014/0306504 A1* | 10/2014 | Boy ......................... B60N 2/62 297/313 |
| 2014/0361571 A1* | 12/2014 | Line ..................... B60N 2/0244 297/284.9 X |
| 2015/0274050 A1* | 10/2015 | Hosbach .................. B60N 2/62 297/423.26 |

FOREIGN PATENT DOCUMENTS

| | | |
|---|---|---|
| EP | 1266794 | 3/2004 |
| EP | 1123834 | 10/2004 |
| EP | 1050429 | 10/2005 |
| EP | 1084901 | 6/2006 |
| EP | 1674333 | 8/2007 |
| EP | 1950085 | 12/2008 |
| EP | 1329356 | 11/2009 |
| JP | 201178557 A | 4/2011 |
| WO | WO9511818 | 5/1995 |
| WO | WO9958022 | 11/1999 |
| WO | WO2006131189 | 12/2006 |
| WO | WO2007028015 | 8/2007 |
| WO | 2008019981 A1 | 2/2008 |
| WO | WO2008073285 | 6/2008 |
| WO | WO2011021952 | 2/2011 |
| WO | WO2012008904 | 1/2012 |

OTHER PUBLICATIONS

Mladenov, "Opel Insignia Receives Seal of Approval for Ergonomic Seats," Published Aug. 27, 2008, http://www.automobilesreview.com/auto-news/opel-insignia-receives-seal-of-approval-for-ergonomic-seats/4169/ (2 pages).

Brose India Automotive Systems, "Adaptive Sensor Controlled Headrest," http://www.indiamart.com/broseindiaautomotivesystems/products.html, Oct. 9, 2012 (12 pages).

eCOUSTICS.Com, "Cineak Motorized Articulating Headrest Preview," http://www.ecoustics.com/ah/reviews/furniture/accessories/cineak-motorized-headrest, Oct. 9, 2012 (3 pages).

"'Performance' Car Seat Eliminates Steel," Published in Plastics News—Indian Edition Plastics & Polymer News, (http://www.plasticsinfomart.com/performance-car-seat-eliminates-steel/), Jan. 2012, 3 pages.

"Frankfurt 2009 Trend—Light and Layered." by Hannah Macmurray, Published in GreenCarDesign, (http://www.greencardesign.com/site/trends/00138-frankfurt-2009-trend-light-and-layered), Sep. 2009, 9 pages.

"Thigh Support for Tall Drivers," http://cars.about.com/od/infiniti/ig/2009-Infiniti-G37-Coupe-pics/2008-G37-cpe-thigh-support.htm, Dec. 2008 (1 page).

"Imola Pro-fit", Cobra, (http://cobra.subesports.com/products/cat/seats/brand/Cobra/prodID/656), Dec. 2012 (1 page).

* cited by examiner

MANUAL INDEPENDENT THIGH EXTENSIONS

FIELD OF THE DISCLOSURE

The present disclosure generally relates to a vehicle seating assembly, and more particularly to manual independent thigh extensions for a vehicle seat.

BACKGROUND OF THE DISCLOSURE

Modern vehicle seats are becoming more and more comfortable as a further understanding of human ergonomics, posture, and comfortability is studied. Vehicle seating assemblies that include comfort components in the vehicle seat back and the vehicle seat can provide the driver and passengers with improved comfort and increased endurance for extensive vehicle rides. Additionally, various sizes and shapes of drivers and passengers can prove challenging when providing vehicle seating assemblies. Accordingly, vehicle seating assemblies that include components to accommodate the different sizes and shapes of drivers and passengers, as well as the desired posture and sitting positions of those drivers and passengers, has become increasingly important.

SUMMARY OF THE DISCLOSURE

According to one aspect of the present disclosure, a vehicle seating assembly includes a seat base. A seatback is operably coupled to a rear of the seat base. First and second independently moveable thigh supports include a top side, a bottom side, an exterior side, and an interior side. A slide assembly is operably coupled to each of the first and second independently moveable thigh supports. Each of the first and second independently moveable thigh supports are independently translatable forward relative to the seat base. A button assembly operably secures the thigh supports at any of a multitude of positions. The button assembly is disposed on the exterior side of each thigh support. A spring assembly urges each thigh support to a fully forward position. A pivot member operably couples each of the first and second independently moveable thigh supports to the seat base. Each of the first and second independently moveable thigh supports are rotatable relative to the seat base.

According to another aspect of the present disclosure, a vehicle seating assembly includes a seat base. First and second independently moveable thigh supports are coupled to a forward portion of the seat base. Each thigh support is rotatable relative to the seat base and translatable forward relative to the seat base. A spring assembly urges each thigh support to a fully forward position. A button assembly operably secures the thigh supports at any of a multitude of positions.

According to yet another aspect of the present disclosure, a vehicle seating assembly includes a seat base and first and second thigh supports that are independently translatable forward relative to the seat base and upwardly pivotal relative to the seat base. A spring assembly urges each thigh support to pivot to a fully raised position. A button assembly operably secures each thigh support at any of a multitude of forward positions.

According to still another aspect of the present disclosure, a vehicle seating assembly includes a seat base having first and second independently moveable thigh supports. The thigh supports are operably coupled with a forward portion of the seat base and are also rotatable relative to the seat base. The thigh supports are spring-biased to a fully forward position and include a button assembly that is operable to allow secure engagement of the thigh supports at any of a multitude of positions. The vehicle seating assembly is configured to provide exceptional support and comfort to passengers during both short trips in the vehicle as well as extended trips.

These and other aspects, objects, and features of the present disclosure will be understood and appreciated by those skilled in the art upon studying the following specification, claims, and appended drawings.

DETAILED DESCRIPTION OF THE EMBODIMENTS

Figures 1, 2:
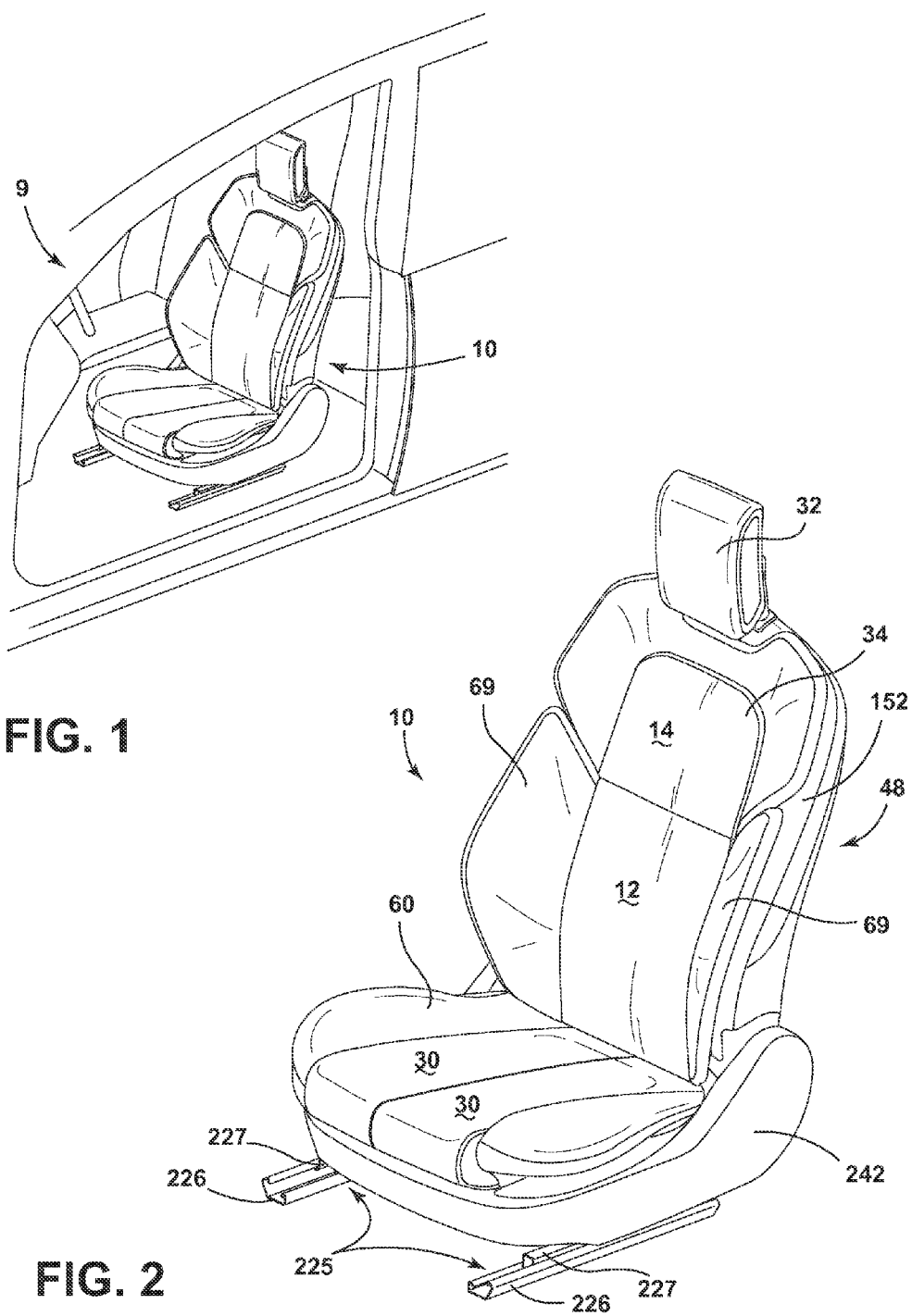
FIG. 1 is a top perspective view of a vehicle seating assembly of the present disclosure disposed in a vehicle.
FIG. 2 is an enlarged top perspective view of the vehicle seating assembly of FIG. 1.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Figure 3:
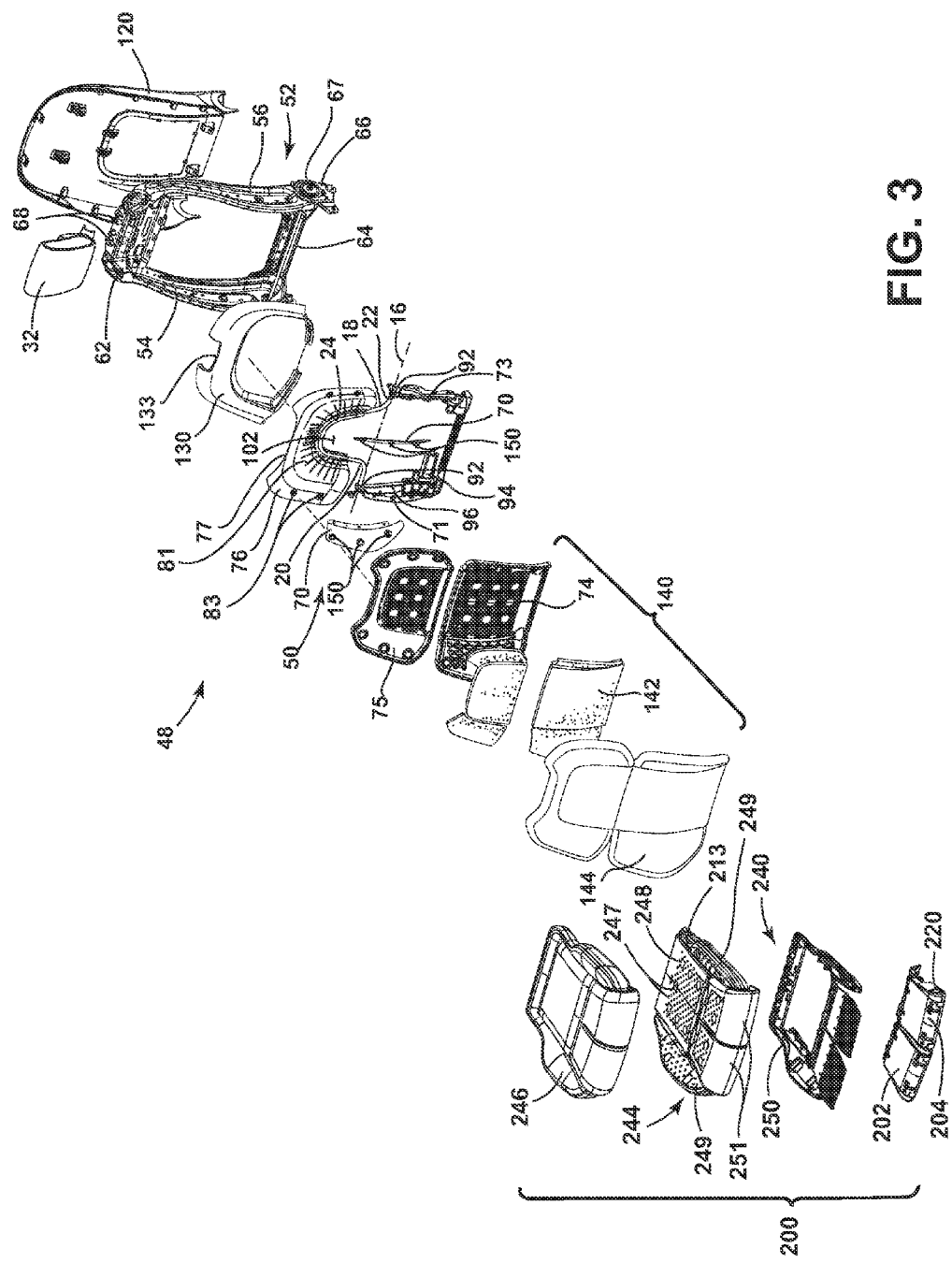
FIG. 3 is a top perspective exploded view of one embodiment of the vehicle seating assembly of the present disclosure.

Referring to the embodiment generally illustrated in FIGS. 1-7, reference numeral 9 designates a vehicle having a vehicle seating assembly 10 that includes a lower seatback 12. An upper seatback 14 is operably coupled to the lower seatback 12. The upper seatback 14 is pivotally mounted to the lower seatback 12 at a pivot axis 16. An arcuate back support bar 18 is disposed in the upper seatback 14 and is configured to rotate the upper seatback 14 between forward and rearward positions. The arcuate back support bar 18 includes first and second generally linear members 20, 22 and an arcuate intermediate portion 24 disposed between the first and second generally linear members 20, 22 (FIG. 3). A reclining assembly operably couples the lower seatback 12 with the upper seatback 14.

With reference again to FIG. 1, the illustrated vehicle seating assembly 10 is configured for use in a vehicle of any type, including, without limitation, cars, vans, trucks, buses, etc. The vehicle seating assembly 10 is suspended on rails that allow movement of the vehicle seating assembly 10 in fore and aft directions. In addition, the vehicle seating assembly 10 may include a variety of comfort controls, including, for example, thigh support using independent thigh supports 30, lumbar support, and upper thoracic support. The vehicle seating assembly 10 includes a head restraint 32 that is disposed on the upper seatback 14. The head restraint 32 is moveable between forward and rearward positions to accommodate various sized heads of passengers, as well as different heights of passengers. The vehicle seating assembly 10 also includes controls specifically configured to adjust an upper thoracic portion 34 of the upper seatback 14.

With reference to FIG. 3, the vehicle seating assembly 10 includes a seatback assembly 48 with a seatback suspension system 50 supported on a frame 52. The frame 52 of the seatback assembly 48 of the vehicle seating assembly 10 includes a first side support 54 and a second side support 56 that define the frame 52. The first and second side supports 54, 56 of the frame 52 pivotally couple with a rear portion of a seat 60 and extend upward from the seat 60 to a top portion of the seatback assembly 48 and connect with an upper lateral brace 62. The upper lateral brace 62 of the seatback assembly 48 extends between the first and second side supports 54, 56. The head restraint 32 is operably coupled with the upper lateral brace 62 of the seatback assembly 48 and is substantially centered between the first and second side supports 54, 56. The upper lateral brace 62, as well as a lower lateral brace 64, of the seatback suspension system 50 are coupled with and span between the first and second side supports 54, 56, such that the seatback suspension system 50 is positioned generally between the head restraint 32 and the seat 60 to support the back of a passenger. It is contemplated that the head restraint 32 may be integrated with the top portion of the seatback assembly 48 or that the head restraint 32 may otherwise not be included on the vehicle seating assembly 10.

Referring again to FIG. 3, the first and second side supports 54, 56 extend upward from a recliner heart bracket 66 having a recliner heart 67 that pivotally couples the seatback assembly 48 with the seat 60. The first and second side supports 54, 56 are substantially parallel with each other and curve upward and rearward from the recliner heart bracket 66 to provide a curved shape that complements the shape of the spinal column of a passenger. Further, the first and second side supports 54, 56 are thicker and more robust proximate the recliner heart bracket 66 and taper as they extend upward to couple with the upper lateral brace 62 that extends orthogonally between the first and second side supports 54, 56. The upper lateral brace 62 of the frame 52 includes connectors 68 for securing the head restraint 32 at a central portion of the upper lateral brace 62 centrally between the first and second side supports 54, 56. The connectors 68 are defined by upward protruding tabs configured to couple with the head restraint 32.

With reference again to FIGS. 3-7, the lower seatback 12 of the seatback suspension system 50, as shown in FIG. 3, includes flex members 70 extending from each of a first side connector 71 and a second side connector 73 of the seatback assembly 48. The first and second side connectors 71, 73 are operably coupled with and support side bolsters 69 (FIG. 2). The lower seatback 12 is positioned adjacent to the seat 60 and includes a lower comfort carrier 74 that supports the lower back of a passenger. Similarly, the upper seatback 14 of the seatback assembly 48 has an upper comfort carrier 75 operably coupled with a curved flex member 76 operably coupled with the arcuate back support bar 18. The flex member 76 of the upper lateral brace 62 is disposed above the first and second side connectors 71, 73. The flex member 76 includes a recess 77 in a top portion thereof configured to adequately space the flex member 76 from the head restraint 32. The flex member 76 also includes a plurality of outwardly extending reinforcement flanges 81. The curved flex member 76 includes connecting features 83 that work as snap-fit connecting arrangements to secure the upper comfort carrier 75 with the curved flex member 76. In the illustrated embodiment, the arcuate back support bar 18 is coupled with the flex member 76 via a friction-fit engagement. Other connecting arrangements are also contemplated. It is conceivable that the lower and upper seatbacks 12, 14 may be integrated into a single component or several components spanning the seatback assembly 48.

The flex member 76 of the upper seatback 14 of the seatback suspension system 50, as shown in FIGS. 4-7, generally defines a support basket that supports the upper back of a passenger. The flex member 76 of the upper lateral brace 62 is coupled with the arcuate back support bar 18 that laterally extends between the first and second side supports 54, 56 of the frame 52. The arcuate back support bar 18 is pivotally coupled relative to pivot pins 92 to allow the flex member 76 to pivot forward and rearward about the pivot axis 16. Further, the arcuate back support bar 18 is operably coupled with a motor 94 via a linking member 96 to adjustably rotate the arcuate back support bar 18. Consequently, the upper seatback 14 can be pivoted forward and rearward relative to a plurality of angled positions to the lower seatback 12 and the frame 52, as described in more detail below.

With reference again to FIGS. 3-6, the pivot pins 92 generally define the pivot axis 16. The upper seatback 14 includes a forward articulating portion that is operably coupled to the lower seatback 12. More specifically, the forward articulating portion is pivotally mounted to the lower seatback 12 at the pivot axis 16. The arcuate back support bar 18 is disposed in the upper seatback 14 and configured to rotate the upper seatback 14 between forward and rearward positions. The arcuate back support bar 18 includes a generally U-shaped configuration. The first and second generally linear members 20, 22 and the arcuate intermediate portion 24 generally define a central open space 102 in the seatback assembly 48. An articulation assembly operably couples the forward articulating portion of the upper seatback 14 with the seatback assembly 48 and allows for movement between the forward and rearward positions. Notably, the flex member 76 or support basket may be fastened to the arcuate intermediate portion 24 of the arcuate back support bar 18, or may be overmolded directly onto the arcuate intermediate portion 24. The arcuate back support bar 18 is connected to brackets that extend forward relative to the first and second generally linear members 20, 22 of the arcuate back support bar 18. The arcuate back support bar 18 is configured to rotate about a forward portion of the brackets at the pivot pins 92. Consequently, the entire upper seatback 14 can be rotated about a forward portion of the brackets.

The seatback suspension system 50, as shown in FIG. 3, includes the frame 52, which may be constructed of metal or other rigid material, and a hard back panel 120 configured to substantially enclose a rear portion of the frame 52. The vehicle seating assembly 10 also includes a front trim panel 130. The front trim panel 130, together with the hard back panel 120, generally define a shell that covers the frame 52 of the seatback assembly 48. The hard back panel 120 couples with the frame 52 to substantially enclose a rear portion of the frame 52. Similarly, the front trim panel 130 couples with a front portion of the frame 52 to enclose a top front portion of the frame 52. The front trim panel 130 includes a mounting cutaway 133 for accommodating the head restraint 32, which extends therethrough to couple with the upper lateral brace 62 of the frame 52. The front trim panel 130 and the hard back panel 120 also engage the frame 52 proximate the upper lateral brace 62, the first side support 54, and the second side support 56, substantially enclosing an edge portion of the frame 52. The front trim panel 130 and hard back panel 120 are typically molded with a polymer material and the frame 52 is constructed substantially of steel, aluminum, or another substantially rigid metal. It is conceivable that alternative materials or forming methods may be used for the shell and the frame 52. In addition, the shell, or portions thereof, may conceivably be integrated with the frame 52.

Referring once again to FIG. 3, the upper seatback 14 and lower seatback 12 of the seatback suspension system 50 are configured to operably couple with a passenger cushion assembly 140. More specifically, the flex members 70, 76 on the lower seatback 12 and upper seatback 14, respectively, extend forward to engage and support the back of a passenger. The passenger cushion assembly 140 includes the lower comfort carrier 74, the upper comfort carrier 75, a cushion assembly 142, and a coverstock 144. The flex members 70, 76 operably couple to the lower comfort carrier 74 and the upper comfort carrier 75 in a snap-fit and friction-fit arrangement. The cushion assembly 142 is disposed between the lower comfort carrier 74 and the upper comfort carrier 75 and the coverstock 144 and between the lower comfort carrier 74 and the coverstock 144. It is conceivable that the passenger cushion assembly 140 may include more or fewer layers between the coverstock 144 and the upper comfort carrier 75. Further, it is conceivable that the passenger cushion assembly 140 may be one integral piece with the flex members 70, 76 of the seatback suspension system 50.

As shown in FIG. 3, the flex members 70 each include three connecting features 150 arranged longitudinally and in alignment with complementary features on first and second side connectors 71, 73 of the lower seatback 12 for fastening the flex members 70 of the lower seatback 12 to the passenger cushion assembly 140. The flex members 70 of the lower seatback 12 extend forward and outward from the seatback assembly 48 to create an external peripheral gap 152. The pivot pins 92 pivotally couple with the first and second side connectors 71, 73, generally above the lower lateral brace 64.

Referring again to FIGS. 1-5, the vehicle seating assembly 10 includes a seat 200. The seatback assembly 48 is operably coupled to a rear of the seat 200. Each of the first and second independently moveable thigh supports 202, 204 include an outer shell 205 having a top side 206, a bottom side 208, an exterior side 210, and an interior side 212. The first and second independently moveable thigh supports 202, 204 are operably coupled with a seat base 213 at a rear of the seat 200. The first and second independently moveable thigh supports 202, 204 are slidably supported on a slide assembly 214. Each of the first and second independently moveable thigh supports 202, 204 are independently translatable forward and rearward relative to the seat 200. A button assembly 220 operably secures the first and second independently moveable thigh supports 202, 204 at any of a multitude of positions. The button assembly 220 is disposed on the exterior side 210 of each of the first and second independently moveable thigh supports 202, 204 and held in place by a button housing 221. A spring assembly 222 urges each thigh support 202, 204 to a fully forward position. A pivot member 224 operably couples each of the first and second independently moveable thigh supports 202, 204 to the seat 200. Each of the first and second independently moveable thigh supports 202, 204 are rotatable relative to the seat 200.

As previously noted, the vehicle seating assembly 10 is supported on rail slide assemblies 225 (FIG. 2) that include a rail 226 fixedly attached to a floor of the vehicle and a slide 227 fixedly attached to an underside or bottom of the seat 200 of the vehicle seating assembly 10. The rail 226 is slidably coupled with the slide 227, such that the vehicle seating assembly 10 can be moved between fore and aft positions inside the vehicle.

Figure 4:
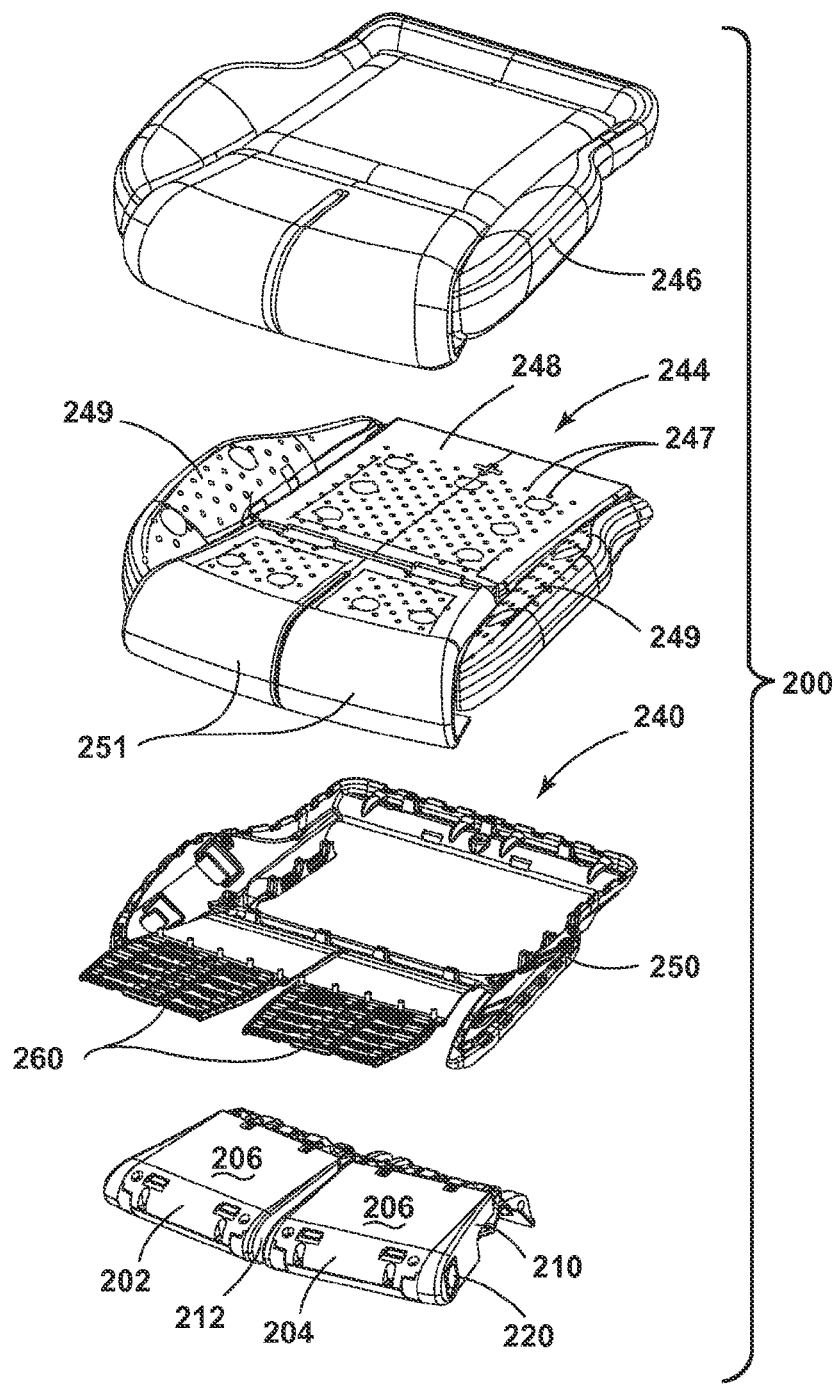
FIG. 4 is a top perspective partial exploded view of a seat of the vehicle seating assembly of the present disclosure.

As clearly illustrated in FIGS. 3 and 4, the seat 200 includes a carrier 240 that is operably coupled with a seat base frame 242, and which is configured to support a seat cushion assembly 244 and a coverstock 246 disposed thereon. A climate control system is also provided, which can draw air from or blow air out of apertures 247 of the seat cushion assembly 244. The seat cushion assembly 244 includes a main cushion 248, seat side bolsters 249, and forward thigh support cushions 251. The carrier 240 includes a peripheral carrier support 250 that interacts directly or indirectly with the seat base frame 242 (FIG. 2). The seat base frame 242 is operably coupled with the rail slide assemblies 225 referenced above. The first and second independently moveable thigh supports 202, 204 are operably coupled to a forward portion of the seat 200, and as noted above, are configured to rotate upward and downward relative to the seat 200 between raised and lowered positions, and are also configured to translate between extended and retracted positions relative to the seat 200. The first and second independently moveable thigh supports 202, 204 are also independent. Specifically, the first independently moveable thigh support 202 may be at the raised position, while the second independently moveable thigh support 204 may be at the lowered position, or at any position in between the raised and lowered positions. First and second seat side supports are adjacent to the first and second independently moveable thigh supports 202, 204, and help cushion and provide support to the buttocks of a passenger.

The peripheral carrier support 250 also includes flexible supports in the form of leg extension trim carriers 260. Each leg extension trim carrier 260 provides support to the seat cushion assembly 244 at the forward thigh support cushions 251. The leg extension trim carriers 260 allow for movement of each of the first and second independently moveable thigh supports 202, 204 between extended and retracted positions, as well as between raised and lowered positions, as the first and second independently moveable thigh supports 202, 204 move. The leg extension trim carriers 260 can include a variety of constructions that may include apertures 259 or a generally solid construction. The apertures 259 minimize the weight of the leg extension trim carriers 260, and add to the overall flexibility of the leg extension trim carriers 260. Regardless, the leg extension trim carriers 260 include a body portion having waved or sinusoidal-type construction defined by alternating ridges and grooves, thereby providing an articulated or corrugated construction that allows for considerable flexibility as the first and second independently moveable thigh supports 202, 204 are adjusted. As will be disclosed in further detail below, the first and second independently moveable thigh supports 202, 204 include spring assemblies 270 configured to urge each of the first and second independently moveable thigh supports 202, 204 to pivot to a fully raised position, as well as spring assemblies configured to bias the first and second independently moveable thigh supports 202, 204 to a fully extended position.

With reference again to FIGS. 3 and 4, the independent flexible extension trim carriers 260 are configured to support the forward thigh support cushions 251 and a portion of the coverstock 246 thereon. At the same time, the leg extension trim carriers are configured to slide against the first and second independently moveable thigh supports 202, 204, as the first and second independently moveable thigh supports 202, 204 are articulated between raised and lowered positions and between retracted and extended positions. Accordingly, the leg extension trim carriers 260 allow for a uniform and constant feel to the passenger as the first and second independently moveable thigh supports 202, 204 are adjusted. In the illustrated embodiment, there are 10 flexible joints 262 and undulations 261 that allow for movement of the leg extension trim carriers 260. However, it is contemplated that any number of flexible joints may be present and that any number of undulations 261 may be present. Generally, a number of corrugations that results in a low profile, and does not substantially increase the overall surface area of engagement between the leg extension trim carrier 260 and the underlying independent leg extension and thigh support should be considered.

Figure 5:
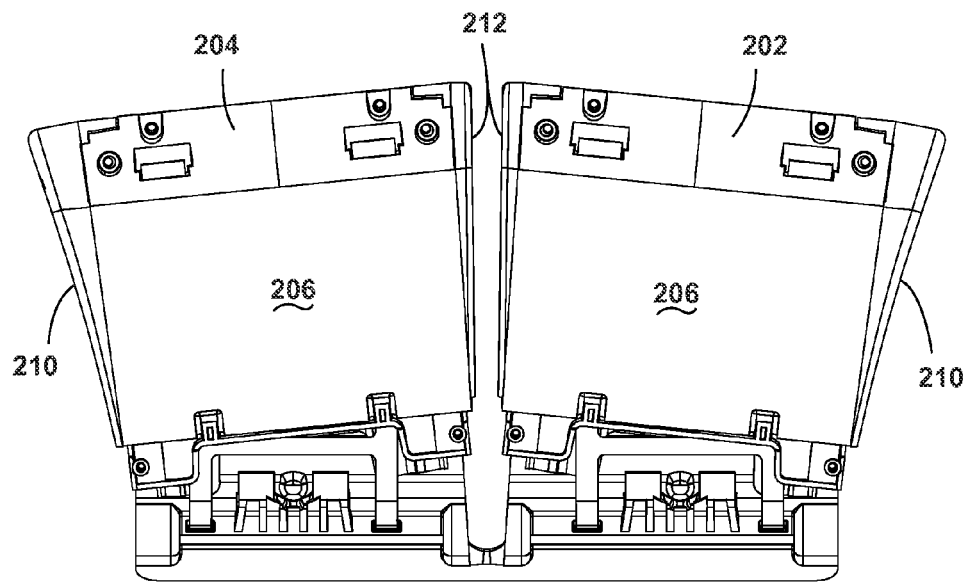
FIG. 5 is a top plan view of one embodiment of first and second independently moveable thigh supports of the present disclosure.
Figure 6:
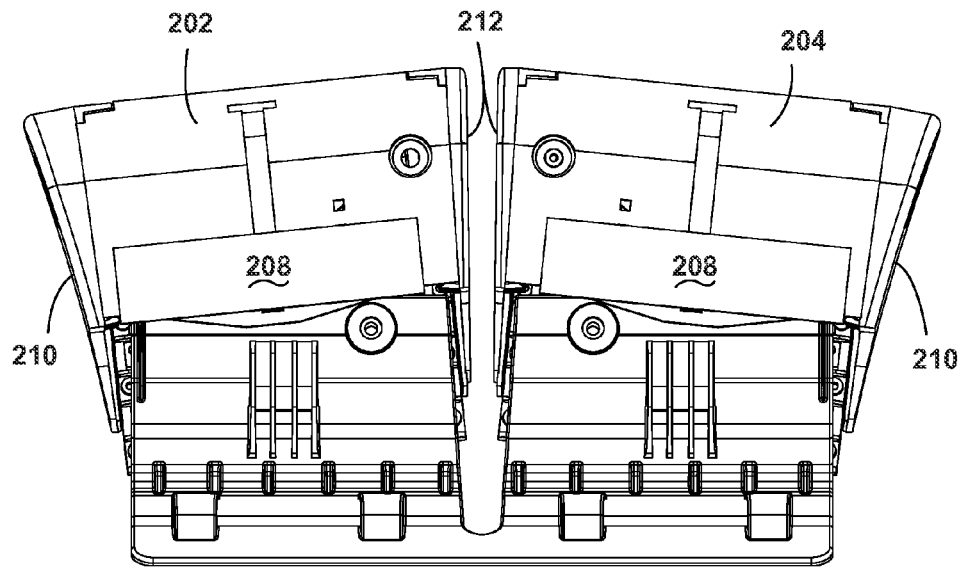
FIG. 6 is a bottom plan view of one embodiment of first and second independently moveable thigh supports of the present disclosure.

With reference now to FIGS. 5 and 6, each shell 205 of the first and second independently moveable thigh supports 202, 204 include a generally flat and planar top side 206. A forward portion of each of the first and second independently moveable thigh supports 202, 204 is rounded to provide comfort to a passenger and also to provide a low friction interface with the leg extension trim carriers 260. A rear portion of each of the first and second independently moveable thigh supports 202, 204 is rotatably coupled with the pivot member 224. Each pivot member 224 includes the spring assembly 270 that urges each of the first and second independently moveable thigh supports 202, 204 to a fully raised position. A rear portion of the pivot member 224 includes a flange that assists in coupling the first and second independently moveable thigh supports 202, 204 to the seat 200.

Figure 7:
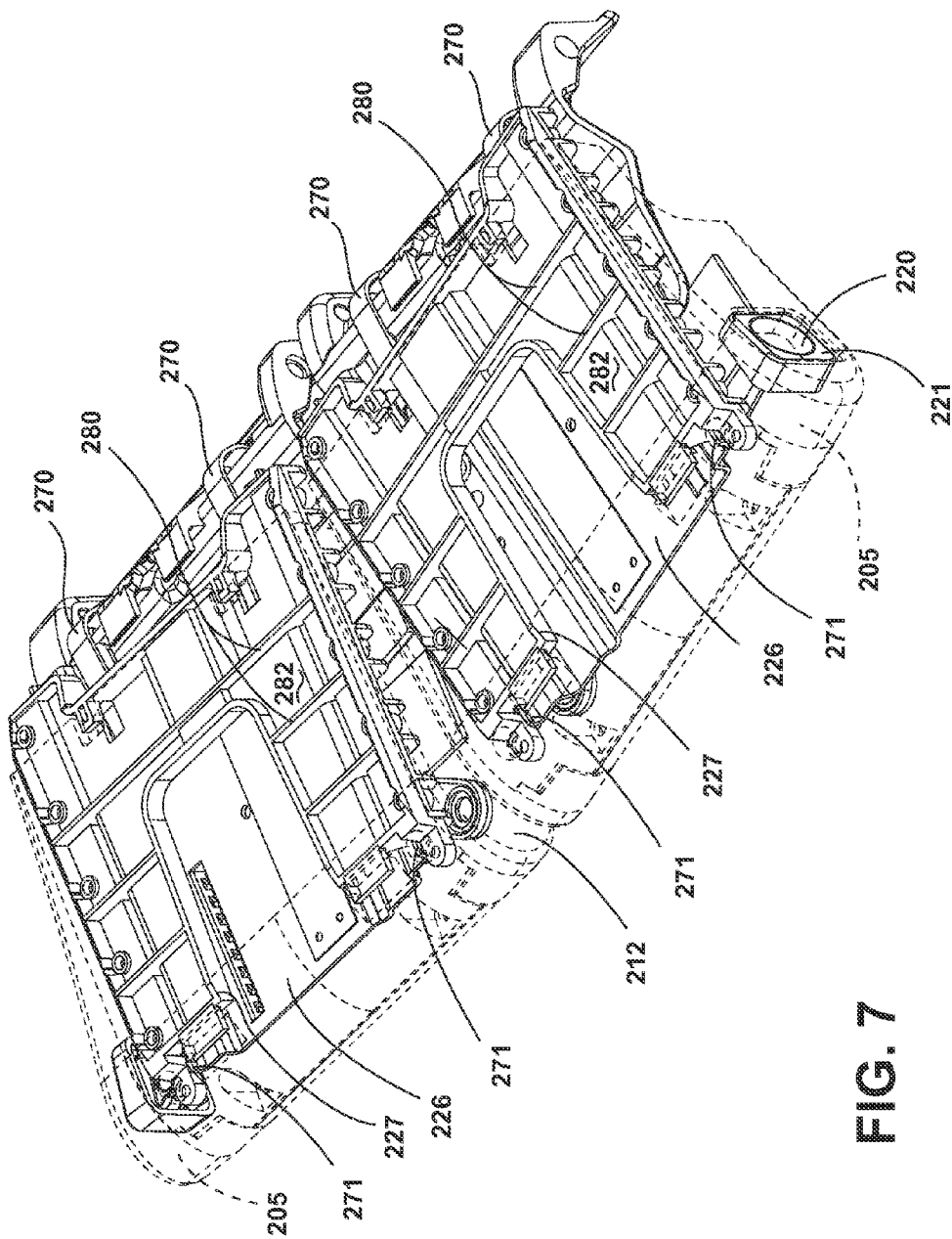
FIG. 7 is a top perspective view of a portion of the first and second independently moveable thigh supports of one embodiment of the present disclosure.

With reference now to FIG. 7, the first independently moveable thigh support 202 is generally shown with the seat cushion assembly 244 and the coverstock 246 in phantom. In addition, the leg extension trim carrier 260 for the first independently moveable is also shown in phantom. The second independently moveable thigh support 204 is shown with only the leg extension trim carrier 260 in place and not wrapped around the shell 205 of the second independently moveable thigh support 204. The thigh support slides 227 are slidably coupled with the rails 226. Each rail 226 includes first and second upstanding flanges 271 upon which the first and second independently moveable thigh supports 202, 204 are configured to slide on between forward and rearward positions. The button assembly 220 is configured to allow movement of the first and second independently moveable thigh supports 202, 204 between forward and rearward positions. The thigh support slide 227 includes a number of flanges 280 that extend upwardly from a body portion 282 of each thigh support slide 227 to provide the slide 227 with additional structural integrity as the slide 227 moves over the rail 226 between various positions.

Figure 8:
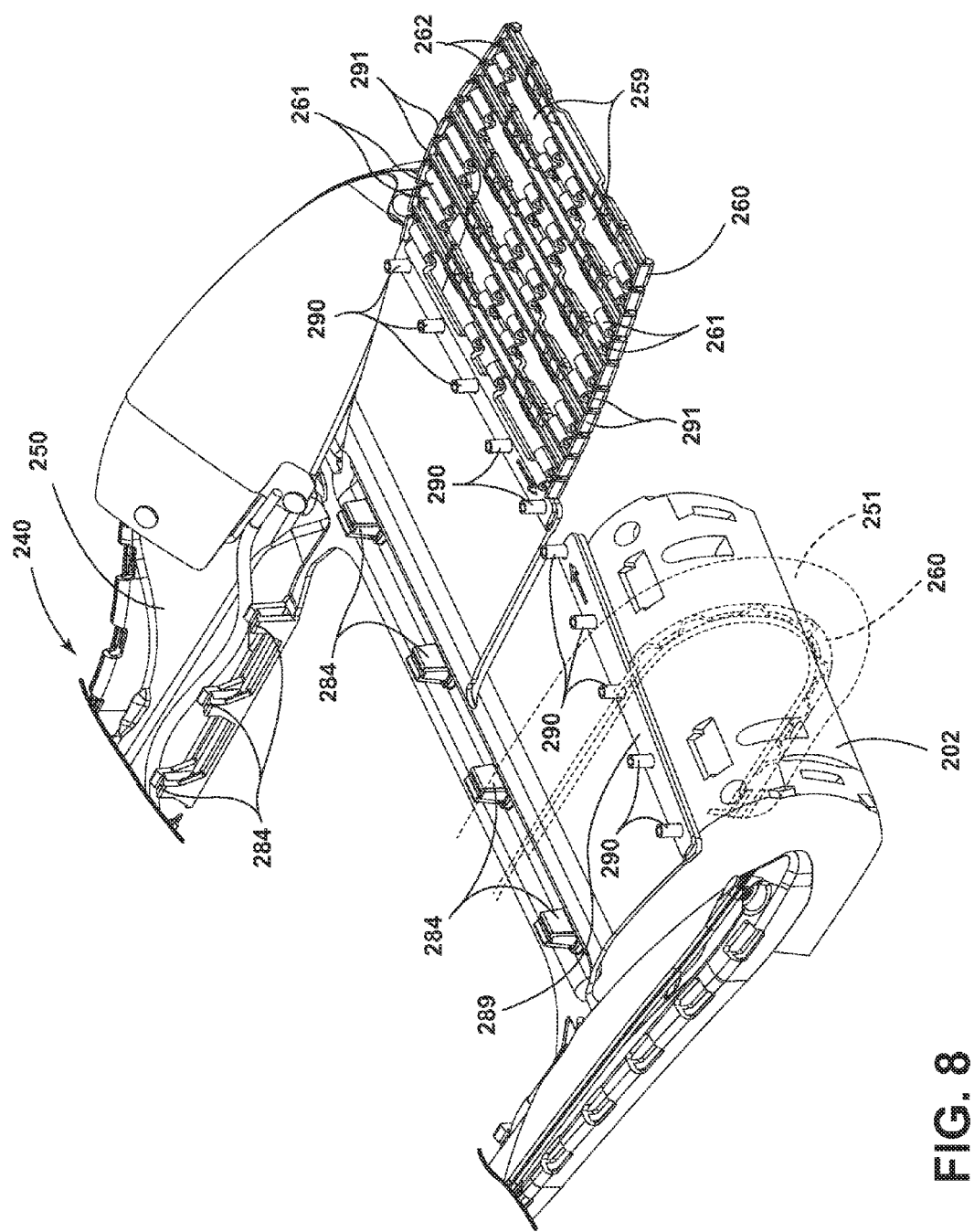
FIG. 8 is a top perspective view of one embodiment of the first and second independently moveable thigh supports in a retracted position.

With reference now to FIG. 8, each leg extension trim carrier 260 includes a rear engagement flange 289 that is operably coupled with upwardly extending connection features 290. The leg extension trim carrier 260 may be heat-staled adhered, mechanically fastened, etc. to the connecting features 290. The seat cushion assembly 244 is configured to extend over the leg extension trim carrier 260 and around the leg extension trim carrier 260 to a bottom side of both of the first and second independently moveable thigh supports 202, 204. In addition, each leg extension trim carrier 260 includes peripheral trim attachment features 291 that secure the forward thigh support cushions 251, and/or the coverstock 144 to the leg extension trim carrier 260. A forward portion of the peripheral carrier support 250 includes clips 284 configured to receive a portion of the seat cushion assembly 244 and the coverstock 246, thereby providing a seam between the seat 200 and the first and second independently moveable thigh supports 202, 204.

Figure 9:
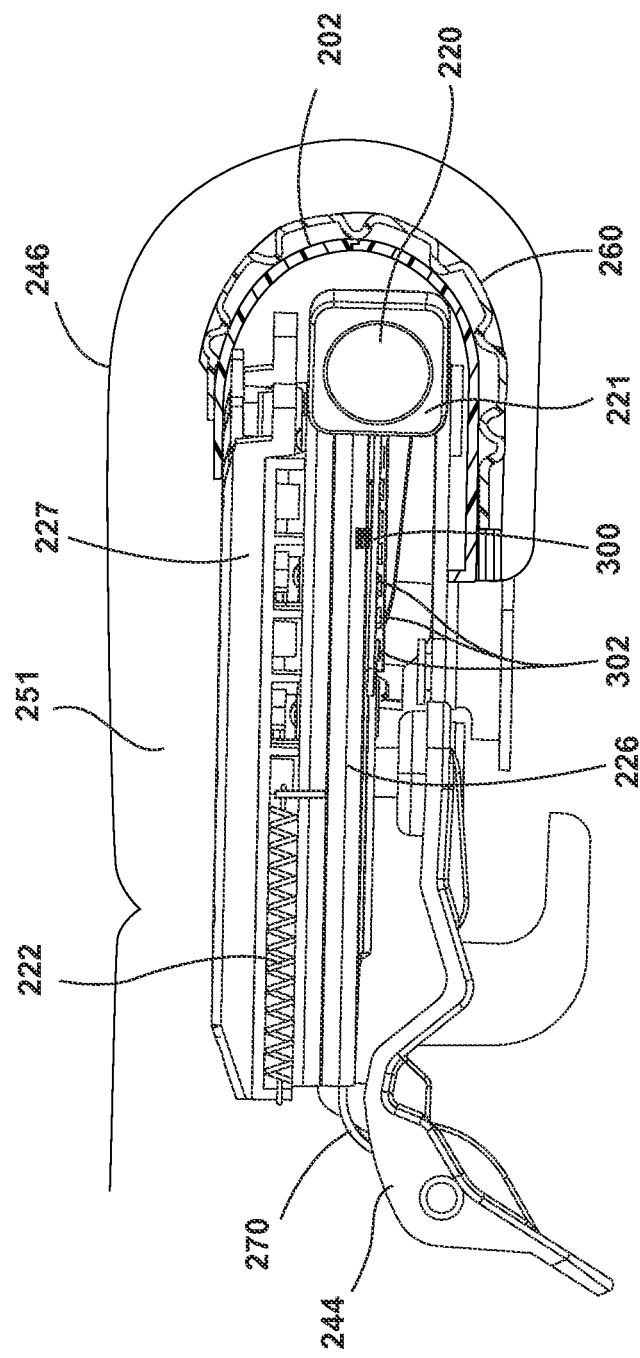
FIG. 9 is a side elevational view of a portion of the first and second independently moveable thigh supports of FIG. 8 in the retracted position.
Figure 10:
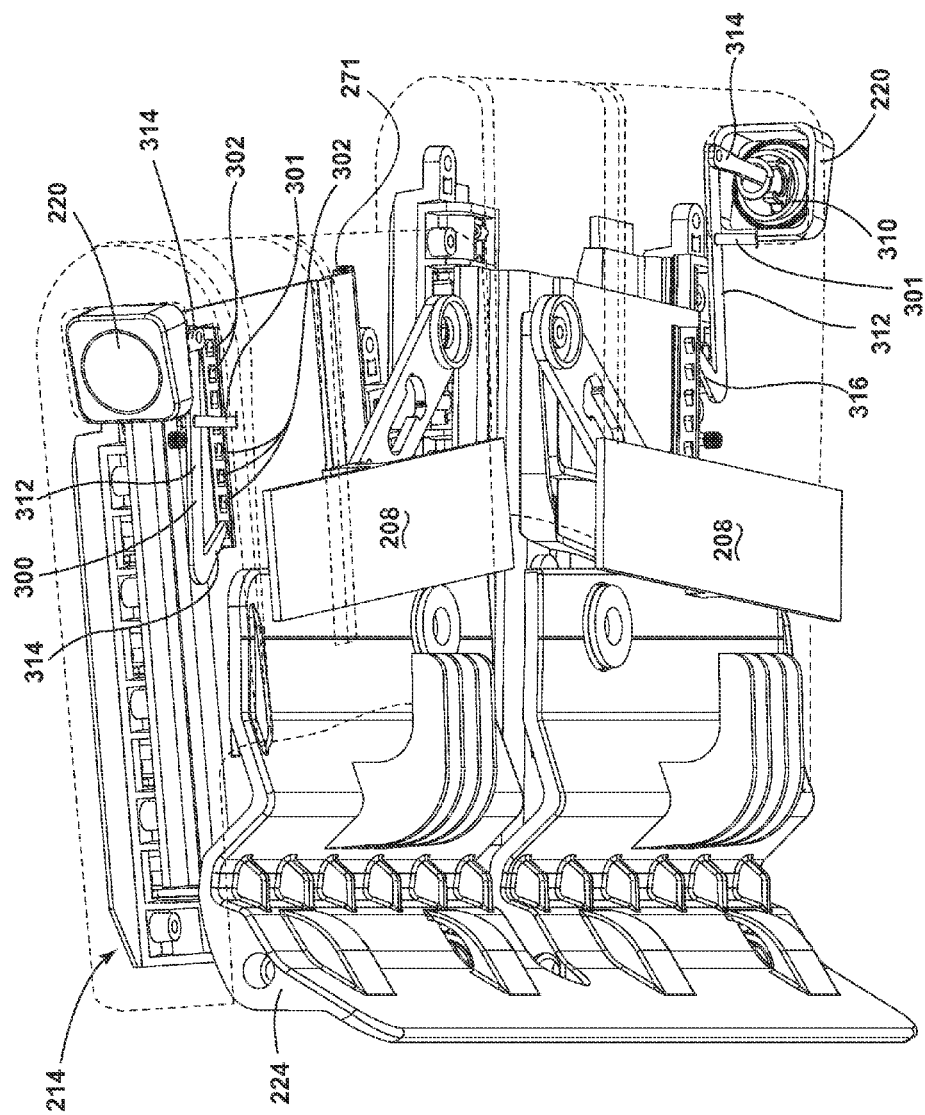
FIG. 10 is a top perspective view of one embodiment of the first and second independently moveable thigh supports with the thigh supports in an extended position.
Figure 11:
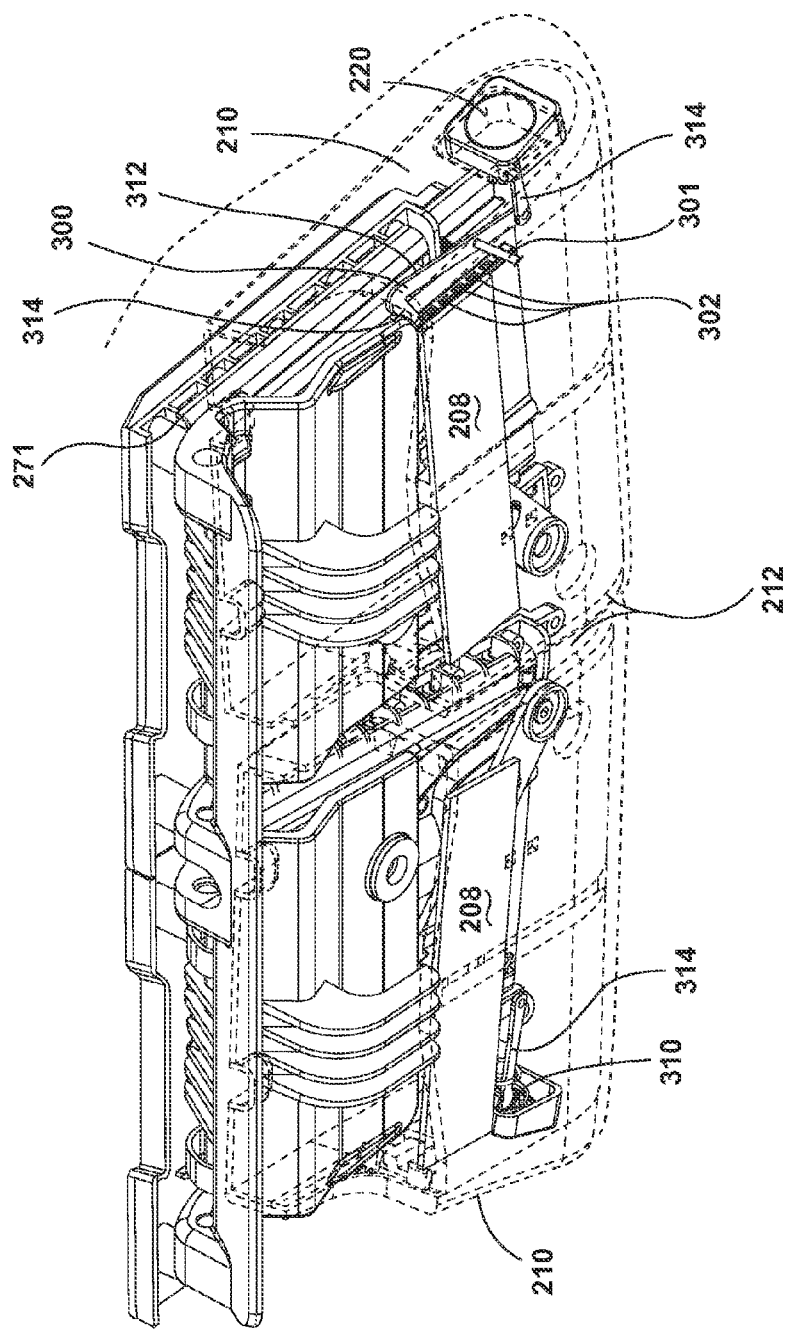
FIG. 11 is a bottom perspective view of one embodiment of the first and second independently moveable thigh supports.

Referring now to FIGS. 9-11, the button assembly 220 is illustrated in a general position proximate to the leg extension trim carrier 260 and the seat cushion assembly 244. As will be shown in more detail, the button assembly 220 of each of the first and second independently moveable thigh supports 202, 204 is operably coupled with a lever 300 that is pivotally coupled with each of the first and second independently moveable thigh supports 202, 204 via a pivot pin 301. The lever 300 is operable between engaged and disengaged positions. An underside of the rail 226 includes a plurality of engagement slots 302 that generally define stop apertures configured to receive an engagement end 316 of the lever 300. As shown in FIG. 9, the first independently moveable thigh support 202 is shown in the rearward position, such that the lever 300 is engaged with a rearmost engagement slot 302. Spring assemblies 222 act to bias the first and second independently moveable thigh supports 202, 204 to the fully extended position. In the illustrated embodiment, the spring assemblies 222 include one or more tension springs. Thus, the spring assembly 222 for the first independently moveable thigh support 202 is shown in an extended state in FIG. 9.

The same construction is shown in FIGS. 10 and 11, which provides a bottom view of the button assembly 220 and the engagement of the lever 300 with the rearmost engagement slot 302 that corresponds with the first independently moveable thigh support 202 being in the rearmost position. Each button assembly 220 is spring-biased by a coil spring 310 (FIGS. 11 and 15) or other type of biasing member to maintain the lever 300 in an engaged position with one of the multitude of engagement slots 302 disposed under the rail 226 of each of the first and second independently moveable thigh supports 202, 204.

The lever 300 includes an intermediate body portion 312 that is pivotally connected with an abutment engagement member 314. The abutment engagement member 314 is in abutting contact with an inside portion of the button assembly 220. The lever 300 also includes the engagement end 316 configured to engage any of the engagement slots 302 provided on the bottom of the first and second independently moveable thigh supports 202, 204. Accordingly, to move the first and second independently moveable thigh supports 202, 204, a user would simply engage the button assembly 220, which results in disengagement of the engagement end 316 from one of the engagement slots 302. A user can then move either of the first and second independently moveable thigh supports 202, 204 depending on preferences. Further, because the first and second independently moveable thigh supports 202, 204 are independently moveable, the first and second independently moveable thigh supports 202, 204 may be set at different positions. As previously noted, the first and second independently moveable thigh supports 202, 204 are biased to an extended position, but are easily moved by a user to a more rearward position, if so desired.

Figure 12:
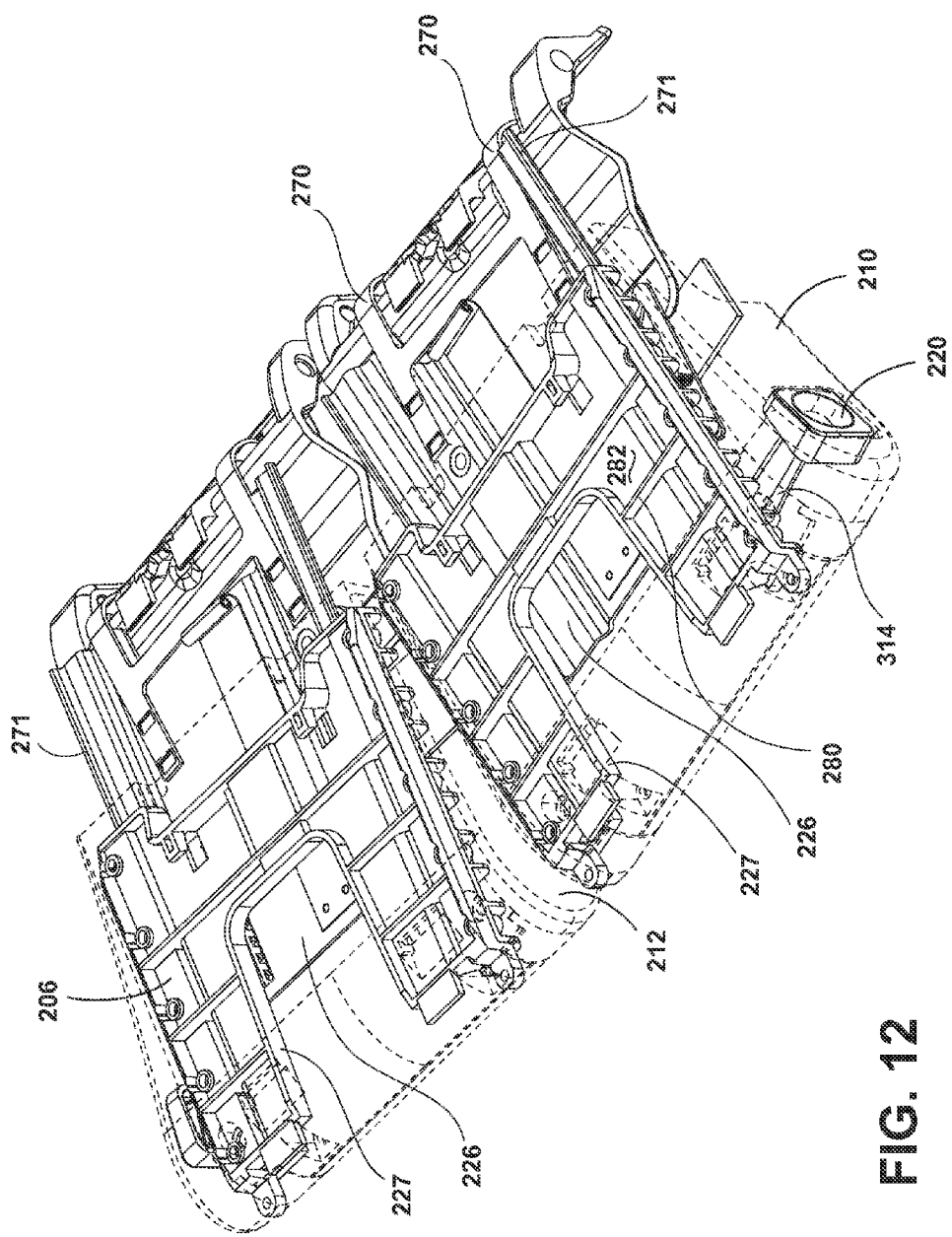
FIG. 12 is a top perspective view of a portion of the first and second independently moveable thigh supports of one embodiment of the present disclosure.
Figure 13:
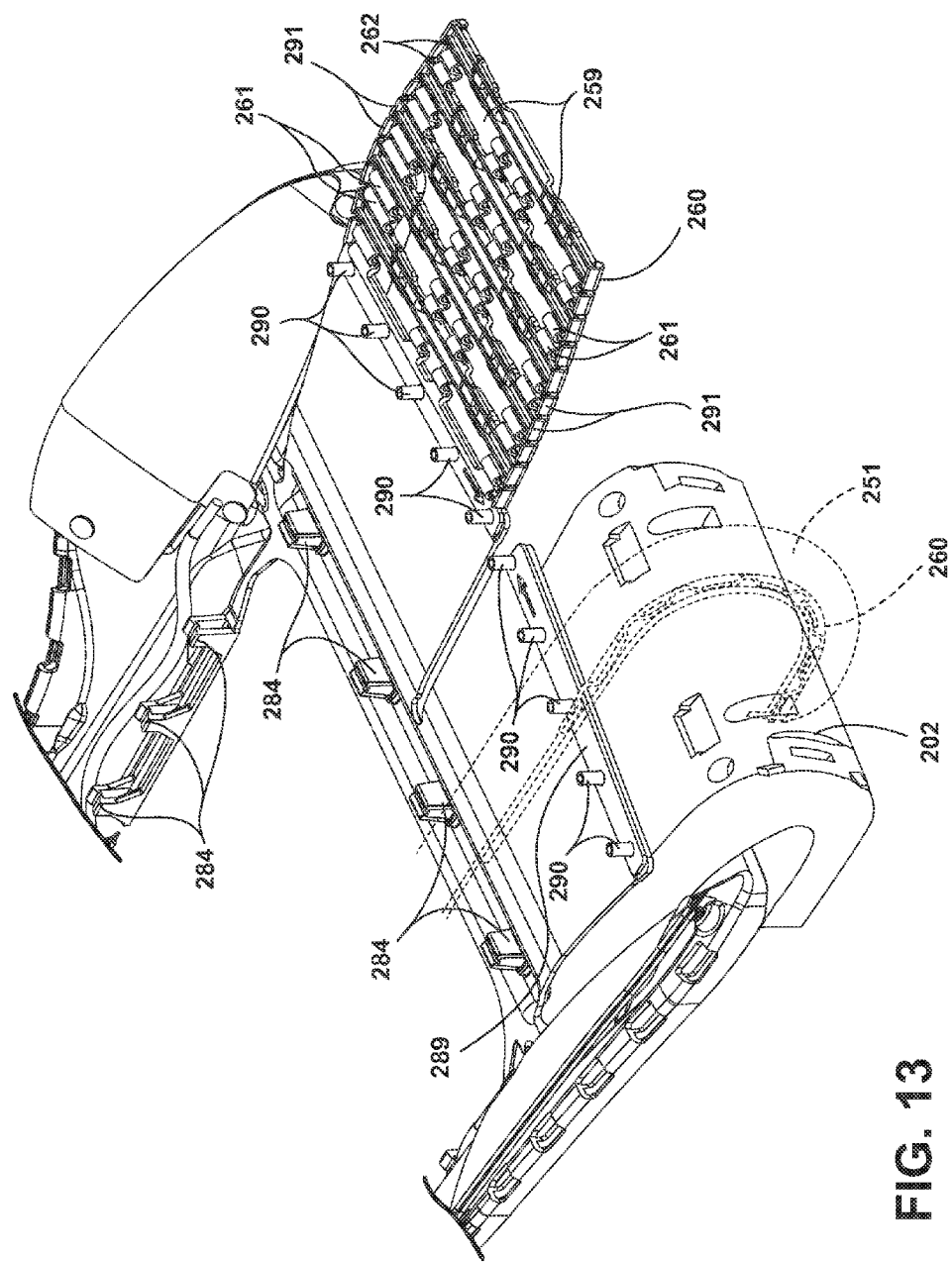
FIG. 13 is a top perspective view of one embodiment of the first and second independently moveable thigh supports in a retracted position.

Referring now to FIG. 12 and as previously mentioned, each of the first and second independently moveable thigh supports 202, 204 are also operable to an extended position. In the extended position, the slides 227 are fully forward and less of the leg extension trim carrier 260 (FIG. 13) extends under the first and second independently moveable thigh supports 202, 204. The slide 227 is configured to slide as far forward as allowed to engage the forwardmost engagement slot 302. When the lever 300 is engaged with the forwardmost engagement slot 302, the relevant thigh support is in the forwardmost position. Of course, the thigh support may be positioned in any of a variety of positions that correspond with the lever 300 engaging any of the engagement slots 302 disposed on the underside of each rail 226.

Figure 14:
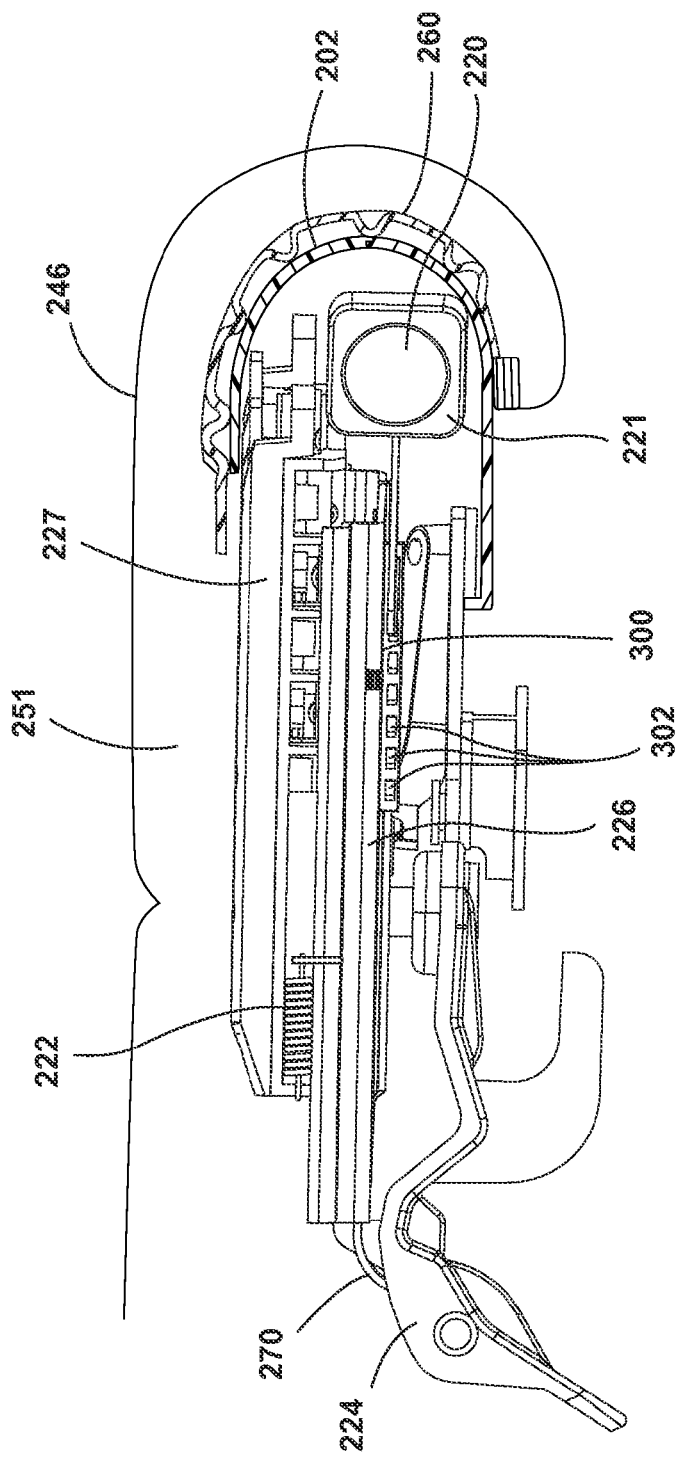
FIG. 14 is a side elevational view of a portion of the first and second independently moveable thigh supports of FIG. 13 in the extended position.
Figure 15:
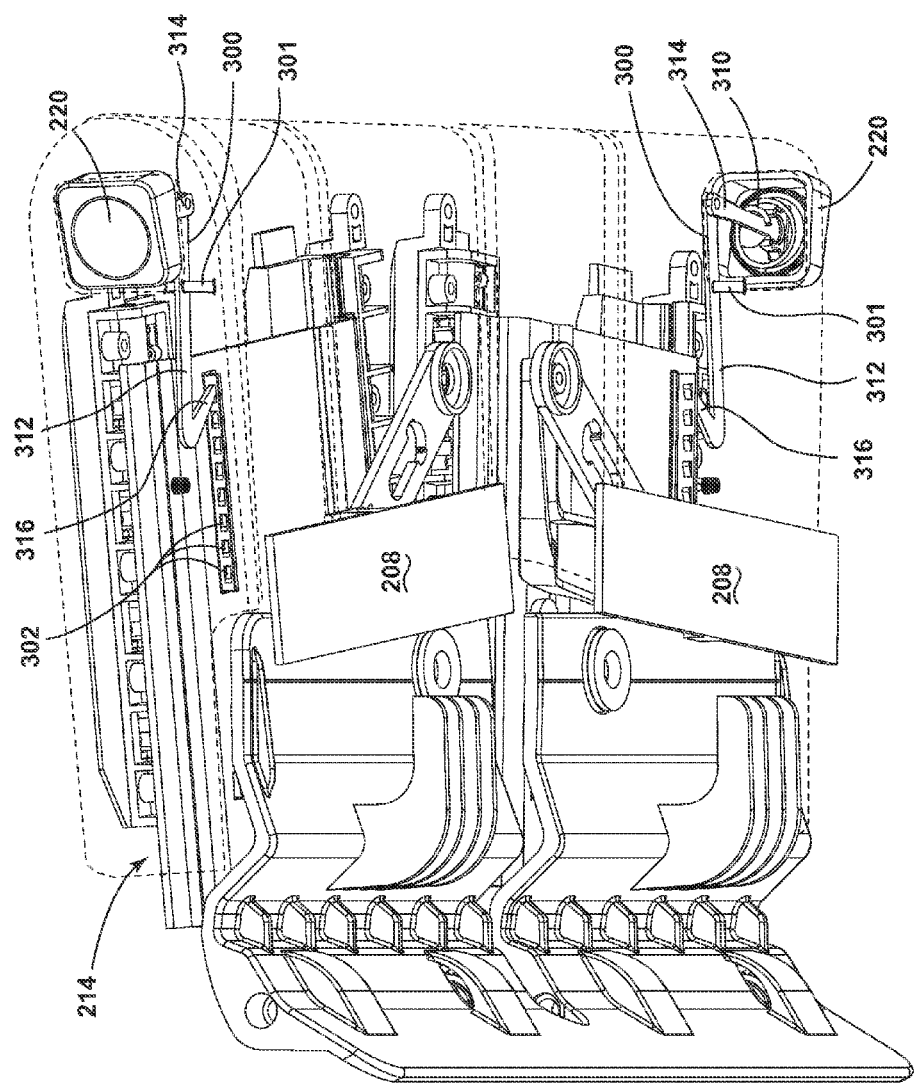
FIG. 15 is a side bottom perspective view of a portion of the first and second independently moveable thigh supports of FIG. 13 in the extended position.
Figure 16:
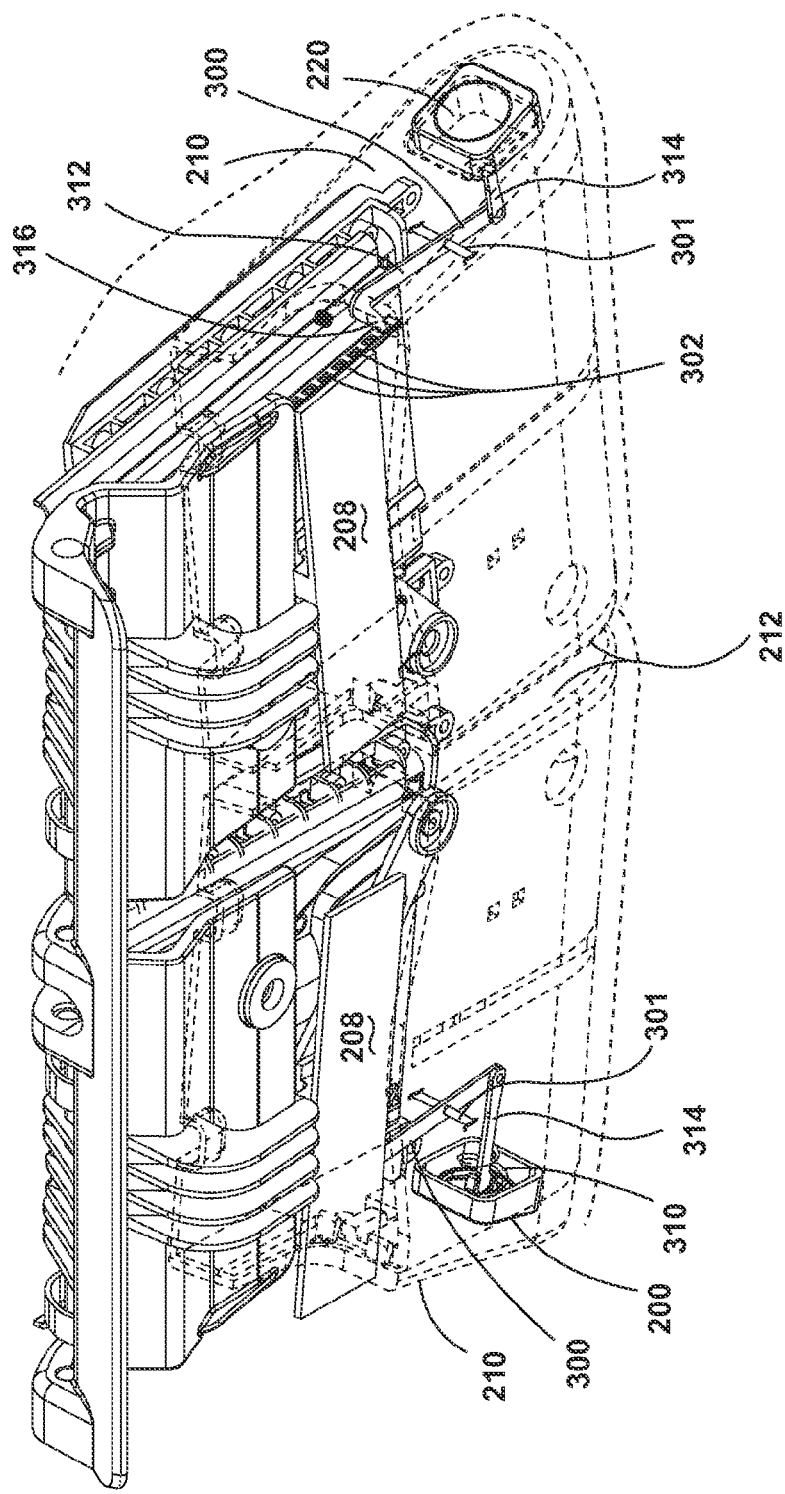
FIG. 16 is a rear bottom perspective view of a portion of the first and second independently moveable thigh supports of FIG. 13 in the extended position.

With reference to FIGS. 14-16, the first independently moveable thigh support 202 is illustrated as being in a forwardmost position, such that the lever 300 is now engaged with a forwardmost engagement slot 302 on a bottom of the rail 226. In this position, the forward seat length of the seat 200 is greatest. Also, as shown in FIG. 14, the spring assembly 222, which includes a tension spring, is compressed and has been drawn down against the biasing force of the spring.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle seating assembly comprising:
    a seat base;
    a seatback operably coupled to a rear of the seat base;
    first and second independently moveable thigh supports, each of the thigh supports including a top side, a bottom side, an exterior side, and an interior side;
    a slide assembly operably coupled to each of the thigh supports, wherein each of the thigh supports are independently translatable forward relative to the seat base;
    a button assembly operable to secure the thigh supports at any of a multitude of positions, the button assembly being disposed on the exterior side of each thigh support;
    a spring assembly that urges each thigh support to a fully forward position; and
    a pivot member operably coupling each of the thigh supports to the seat base, wherein each of the thigh supports are rotatable relative to the seat base.

2. The vehicle seating assembly of claim 1, wherein the button assembly includes a lever that is spring-biased to engage a stop aperture.

3. The vehicle seating assembly of claim 2, wherein the lever is disposed below and is integral with the slide assembly.

4. The vehicle seating assembly of claim 2, wherein the stop aperture and an engagement end of the lever are disposed rearward of the button assembly.

5. The vehicle seating assembly of claim 1, wherein the spring assembly includes a tension spring that couples a rear portion of at least one of the first and second independently moveable thigh supports with the slide assembly.

6. The vehicle seating assembly of claim 1, wherein each of the first and second independently moveable thigh supports includes a tension spring that couples a rear portion of one of the first and second independently moveable thigh supports with the slide assembly.

7. A vehicle seating assembly comprising:
a seat base;
first and second independently moveable thigh supports coupled to a forward portion of the seat base, each thigh support being rotatable relative to the seat base and translatable forward relative to the seat base;
a spring assembly that urges each thigh support to a fully forward position; and
a button assembly operable to secure the thigh supports at any of a multitude of positions.

8. The vehicle seating assembly of claim 7, wherein the button assembly includes a lever that is spring-biased to engage a stop aperture defined in a slide assembly.

9. The vehicle seating assembly of claim 8, wherein the stop aperture and an engagement end of the lever are disposed rearward of the button assembly.

10. The vehicle seating assembly of claim 7, wherein the first and second independently moveable thigh supports are spring-biased to a raised position.

11. The vehicle seating assembly of claim 7, wherein the spring assembly includes a tension spring that couples a rear portion of at least one of the first and second independently moveable thigh supports with the slide assembly.

12. The vehicle seating assembly of claim 7, wherein each of the first and second independently moveable thigh supports includes a tension spring that couples a rear portion of one of the first and second independently moveable thigh supports with the slide assembly.

13. The vehicle seating assembly of claim 7, wherein each of the first and second independently moveable thigh supports includes a leg extension trim carrier.

14. A vehicle seating assembly comprising:
a seat base;
first and second thigh supports that are independently translatable forward relative to the seat base and upwardly pivotal relative to the seat base;
a spring assembly that urges each thigh support to pivot to a fully raised position; and
a button assembly operable to secure each thigh support at any of a multitude of forward positions.

15. The vehicle seating assembly of claim 14, wherein the button assembly includes a lever that is spring-biased to engage a stop aperture defined in a slide assembly.

16. The vehicle seating assembly of claim 15, wherein the stop aperture and an engagement end of the lever are disposed rearward of the button assembly.

17. The vehicle seating assembly of claim 14, wherein the first and second thigh supports are spring-biased to a raised position.

18. The vehicle seating assembly of claim 14, wherein the spring assembly includes a tension spring that couples a rear portion of at least one of the first and second thigh supports with the slide assembly.

19. The vehicle seating assembly of claim 14, wherein each of the first and second thigh supports includes a tension spring that couples a rear portion of one of the first and second thigh supports with the slide assembly.

20. The vehicle seating assembly of claim 14, wherein each of the first and second thigh supports includes a leg extension trim carrier.

* * * * *